(12) United States Patent
Lin

(10) Patent No.: US 7,219,920 B2
(45) Date of Patent: May 22, 2007

(54) EASILY DETACHED AND ASSEMBLED GOLF CART WITH AUXILIARY WHEEL

(76) Inventor: Wen-Tsan Lin, 235 Chung-Ho Box 8-24, Taipei (TW)

( * ) Notice: Subject to any disclaimer, the term of this patent is extended or adjusted under 35 U.S.C. 154(b) by 109 days.

(21) Appl. No.: 11/093,248

(22) Filed: Mar. 29, 2005

(65) Prior Publication Data

US 2006/0226617 A1    Oct. 12, 2006

(51) Int. Cl.
*B62B 3/00* (2006.01)
*B62B 1/00* (2006.01)

(52) U.S. Cl. .................. 280/651; 280/655; 280/47.26; 280/47.24; 280/DIG. 6

(58) Field of Classification Search ................ 280/655, 280/651, 47.26, 47.24, DIG. 6
See application file for complete search history.

(56) References Cited

U.S. PATENT DOCUMENTS 2,619,360 A * 11/1952 Fritz ........................... 280/42
2,914,336 A * 11/1959 Hibben, Jr. et al. ........... 280/42
6,641,228 B2 * 11/2003 Liu ........................ 301/111.06
2001/0033070 A1 * 10/2001 Reimers et al. ............. 280/651
2003/0122353 A1 *  7/2003 Liao ........................... 280/651
2003/0160408 A1 *  8/2003 Liao ........................ 280/47.24
2004/0195806 A1 * 10/2004 Reimers et al. ............. 280/651

* cited by examiner

*Primary Examiner*—Christopher P. Ellis
*Assistant Examiner*—John R. Olszewski

(57) ABSTRACT

An easily detached and assembled golf cart with an auxiliary wheel comprises: a frame having an upper end, a lower end, and a mid-frame pivot; a first wheel rotatably fixed to the first wheel supporter and a second wheel rotatably fixed to the second wheel supporter; and an auxiliary wheel. The cart further comprises a connecting unit having a first retainer, a second retainer connecting to the first retainer and a wheel retainer; a hook unit axially installed to the insertion unit; the hook unit having a plate; the plate having a tenon capable of being inserted into a buckling groove of the first retainer of the connecting unit. When the first retainer of the connecting unit inserts into the insertion unit, the tenon of the plate is buckled into the buckling groove for assembling the connecting unit to the insertion unit.

4 Claims, 8 Drawing Sheets

EASILY DETACHED AND ASSEMBLED GOLF CART WITH AUXILIARY WHEEL

FIELD OF THE INVENTION

The present invention relates to golf carts, and in particular to an easily detached and assembled golf cart with an auxiliary wheel, wherein the golf cart can be used as a two-wheel structure, but when an auxiliary wheel is added, it is used as a three-wheel structure.

BACKGROUND OF THE INVENTION

The prior art golf cart may be designed as a two-wheel structure (see FIG. 7), or as a three-wheel structure (referring to FIG. 8) which are designed to match the requirement of environments. The wheels of a golf cart are undetachable. It is often that the user must prepare two-wheel carts and three-wheel carts for being used in different environments. However this is inconvenient and inefficient. Further, a greater volume is required to store the two carts.

SUMMARY OF THE INVENTION

Accordingly, the primary object of the present invention is to provide an easily detached and assembled golf cart with an auxiliary wheel, wherein the golf cart can be detached and assembled easily and rapidly so as to fit the requirement of the environment. Thereby the golf cart can be folded for transfer or storage. Moreover, the golf cart can be used as a two-wheel structure, but when an auxiliary wheel is added, it is used as a three-wheel structure.

To achieve the above objects, the present invention provides an easily detached and assembled golf cart with an auxiliary wheel. The golf cart comprises: a frame having an upper end, a lower end, and a mid-frame pivot; a first wheel rotatably fixed to the first wheel supporter and a second wheel rotatably fixed to the second wheel supporter; and an auxiliary wheel. The cart further comprises a connecting unit having a first retainer, a second retainer connecting to the first retainer and a wheel retainer; a hook unit axially installed to the insertion unit; the hook unit having a plate; the plate having a tenon capable of being inserted into the buckling groove of the first retainer of the connecting unit. When the first retainer of the connecting unit inserts into the insertion unit, the tenon of the plate is buckled into the buckling groove for assembling the connecting unit to the insertion unit.

The various objects and advantages of the present invention will be more readily understood from the following detailed description when read in conjunction with the appended drawings.

DETAILED DESCRIPTION OF THE INVENTION

Figure 1:
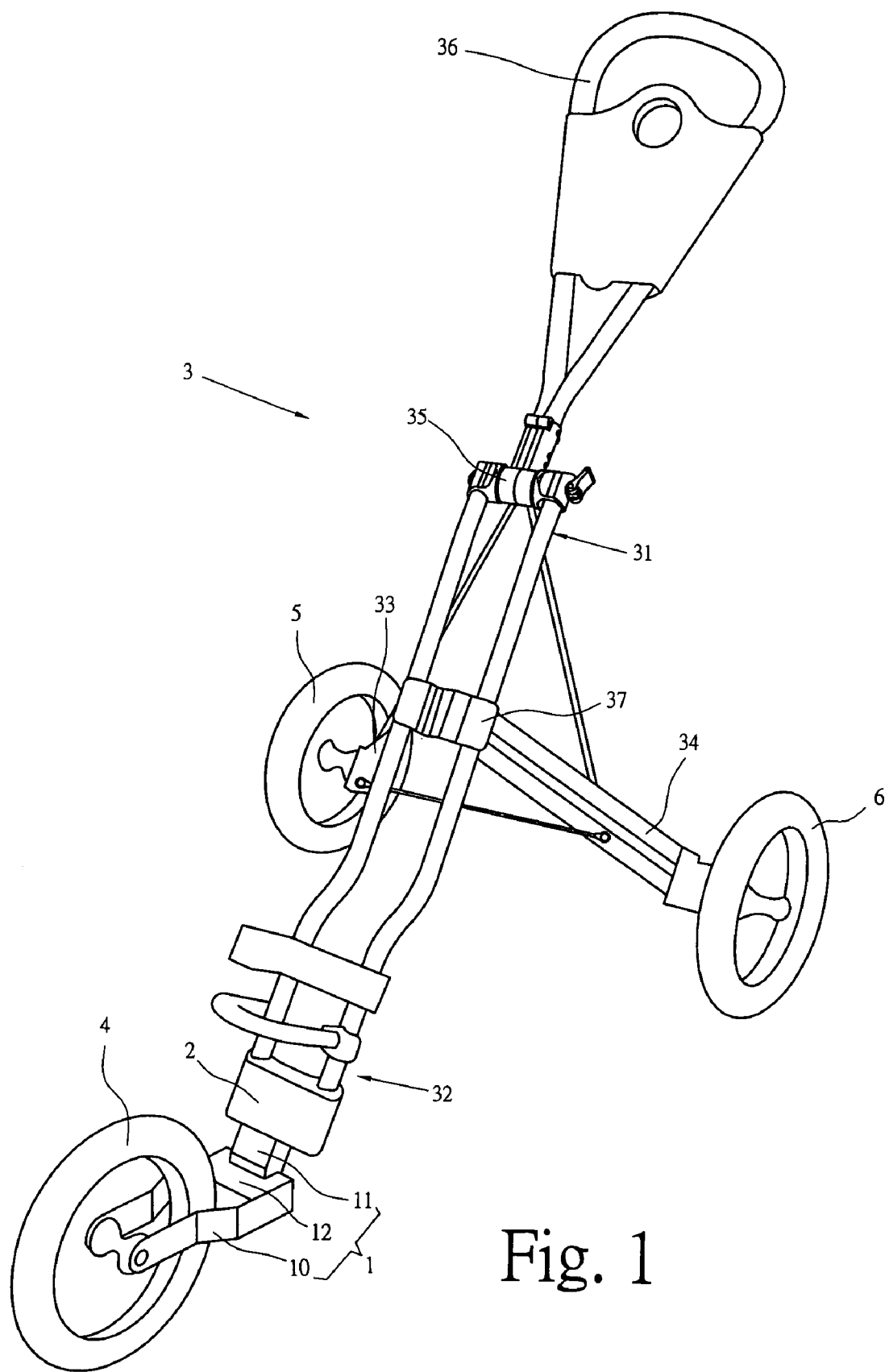
FIG. 1 is a schematic perspective view of the present invention, wherein three wheels are used.

In order that those skilled in the art can further understand the present invention, a description will be described in the following in detail. However, these descriptions and the appended drawings are only used to cause those skilled in the art to understand the objects, features, and characteristics of the present invention, but not to be used to confine the scope and spirit of the present invention defined in the appended claims.

Referring to FIGS. 1–5, the golf cart of the present invention is illustrated. The golf cart has the following elements.

A frame 3 has an upper end 31, a lower end 32, and a mid-frame pivot 37 between the upper end 31 and the lower end 32.

A first wheel 5 is rotatably fixed to the first wheel supporter 33.

A second wheel 6 is rotatably fixed to the second wheel supporter 34

An auxiliary wheel 4 is included.

A connecting unit 1 has a first retainer 11, a second retainer 12 connecting to the first retainer 11 and a wheel retainer 10. One end of the wheel retainer 10 is pivotally connected to the auxiliary wheel 4. Another end of the wheel retainer 10 is connected to the second retainer 12. The first retainer 11 is detachably fixed to an insertion unit 2 of the lower end 32 of the frame 3. The first retainer 11 has at least one buckling groove 111. The first retainer 11 is fixed to an insertion unit 2 of the lower end of the frame 3. The insertion unit 2 has two receiving ends at an upper ends for receiving the two tubes of the frame 3.

Moreover the insertion unit 2 of the present invention is axially installed to a hook unit 20. The hook unit 20 has a plate 21. The plate 21 has a tenon 22 capable of being inserted into the buckling groove 111 of the first retainer 11 of the connecting unit 1.

in assembly the first retainer 11 is inserted into the frame 3 of a lower hole of the insertion unit 2 with the buckling groove 111 of the first retainer 11 is aligned to a lateral hole of the insertion unit. The tenon 22 of the plate 20 passes through the lateral hole of the insertion unit 2 and the buckling groove 111 of the first retainer 1 and then is buckled to the buckling groove 111 for assembling the connecting unit 20 to the insertion unit 2.

As shown in FIGS. 1 to 5, by above mentioned structure, in assembly the first retainer 11 is inserted into the frame 3 of a lower hole of the insertion unit 2 with the buckling groove 111 of the first retainer 11 is aligned to a lateral hole of the insertion unit. The tenon 22 of the plate 20 passes through the lateral hole of the insertion unit 2 and the buckling groove 111 of the first retainer 1 and then is buckled to the buckling groove 111 for assembling the connecting unit 20 to the insertion unit 2. Moreover if the tenon 22 of the plate 20 retracts from the insertion unit 2, the first retainer 11 of the connecting unit 1 will release from the insertion unit 2.

Figure 2:
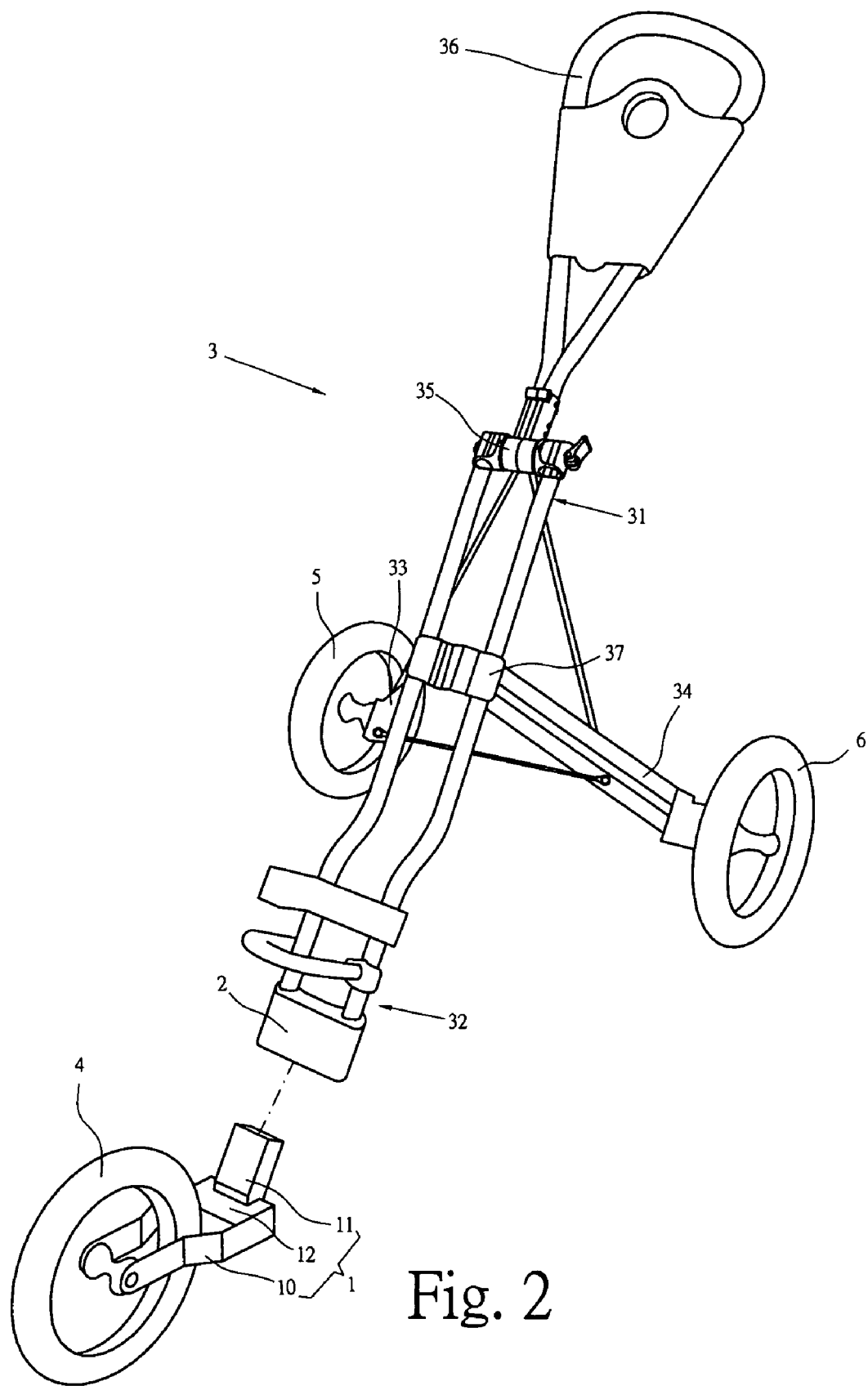
FIG. 2 shows an exploded perspective view of the present invention, where two wheels are used.

With reference to FIGS. 1 and 2, the frame 3 of the present invention further comprises a handle 36 connected to the upper end 31 of the frame 3. The handle 36 is pivotally connected to a pivotal shaft 35 of the upper end 31 of the frame 3. The handle 36 is pivotally installed to the pivotal shaft 35 of the upper end 31.

Figure 3:
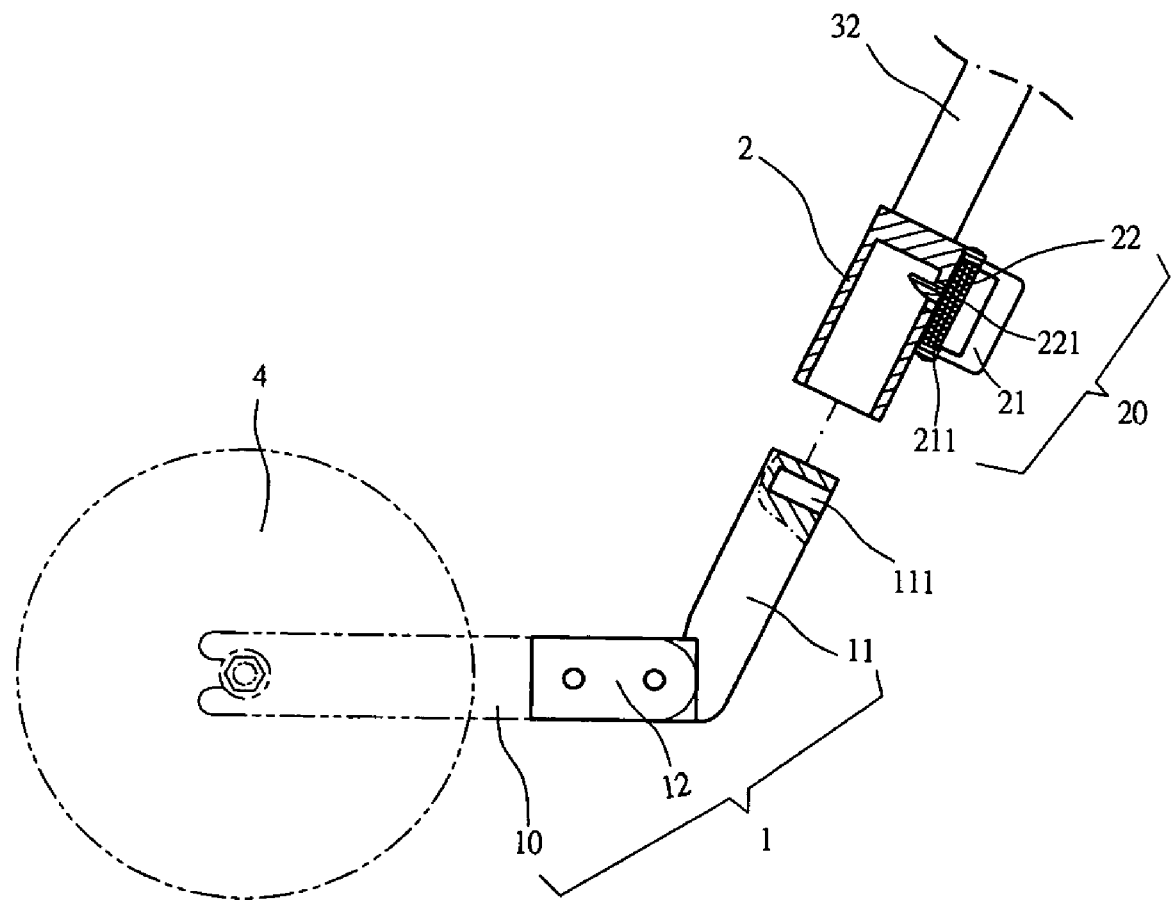
FIG. 3 is another exploded perspective view of the present invention.
Figure 4:
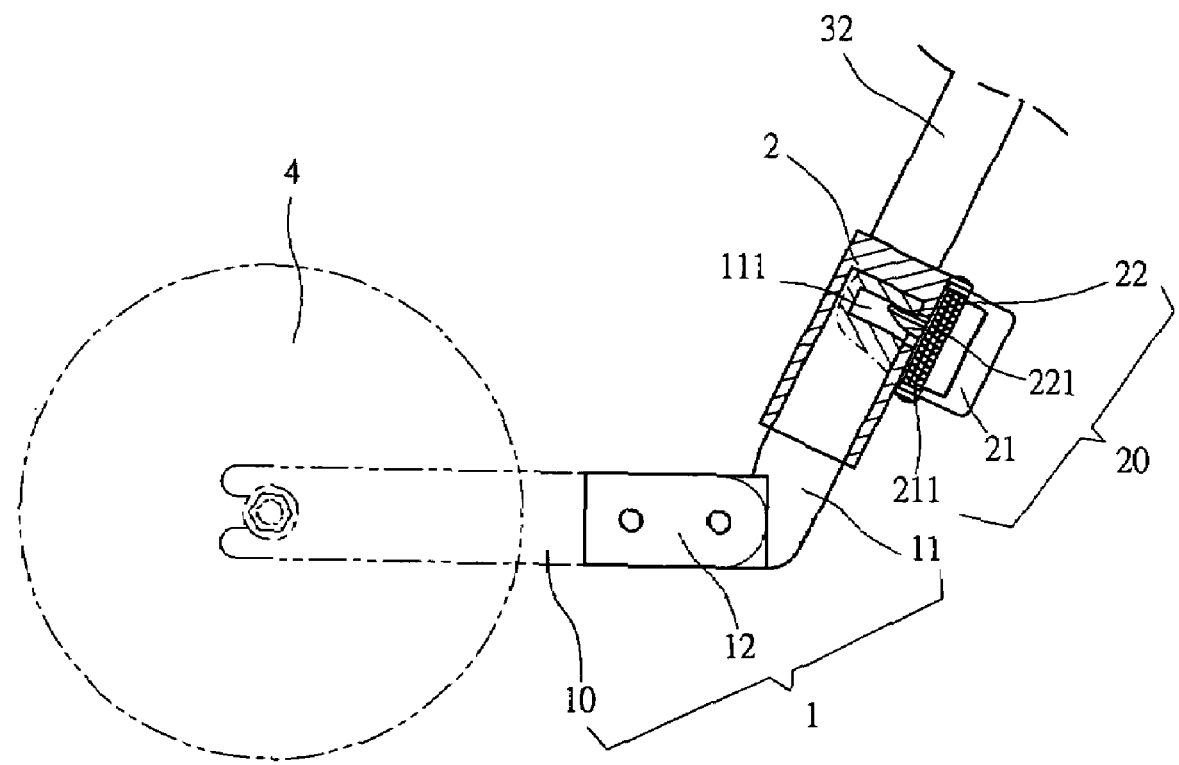
FIG. 4 is a schematic cross sectional view of the present invention.
Figure 5:
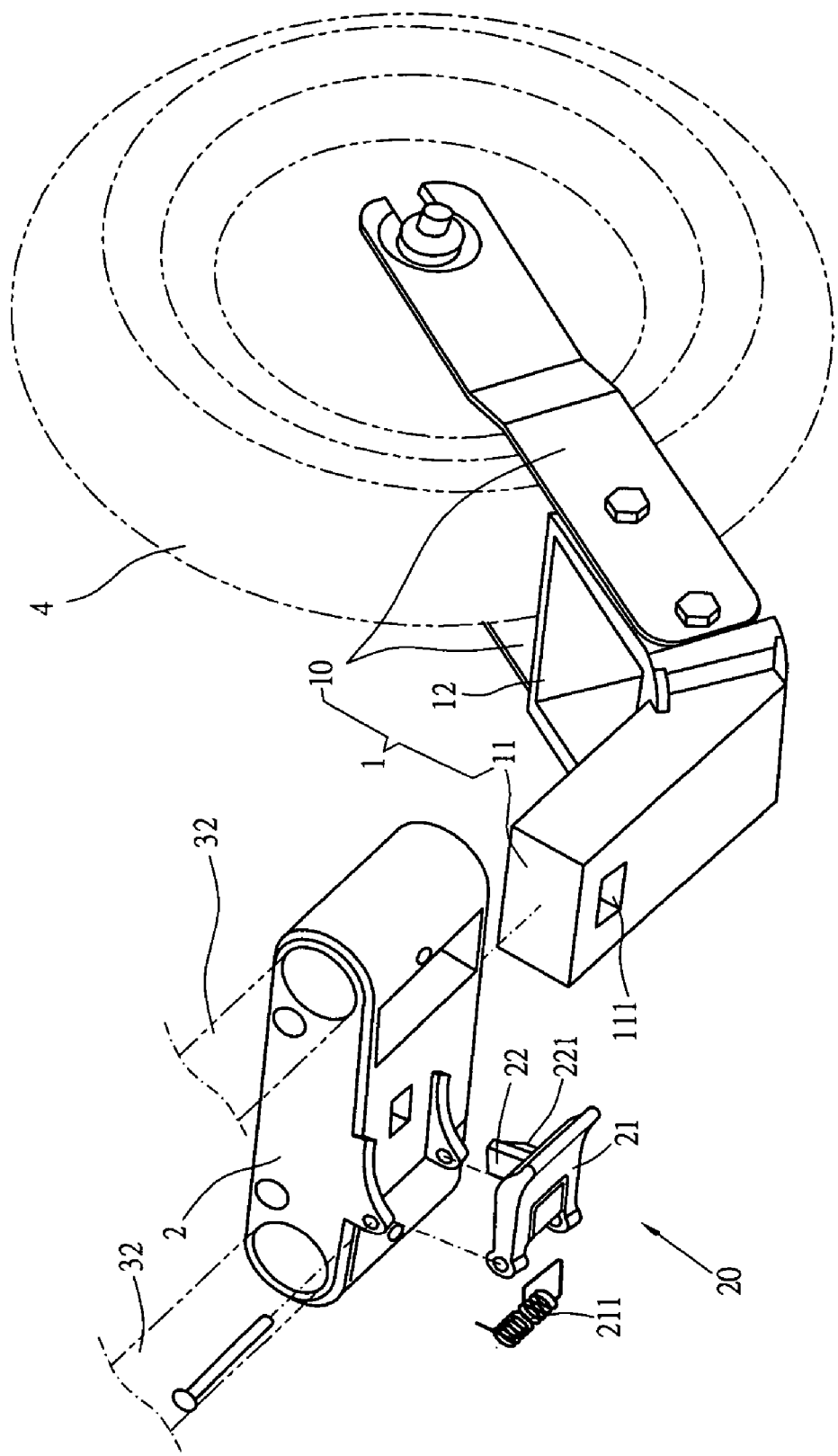
FIG. 5 is an exploded perspective view of the present invention.
Figure 6:
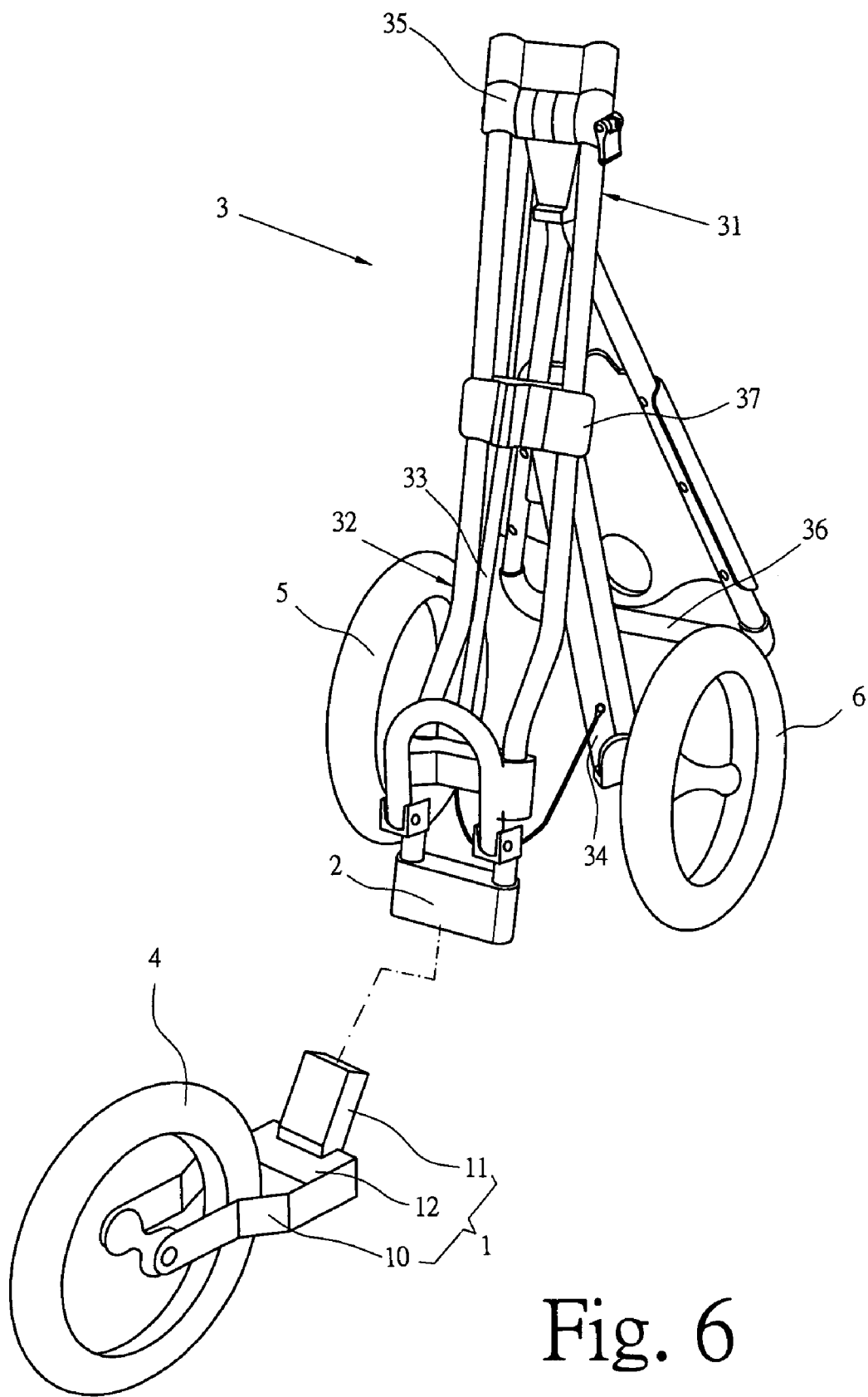
FIG. 6 is a schematic perspective view of the present invention, wherein the golf cart is folded.
Figure 7:
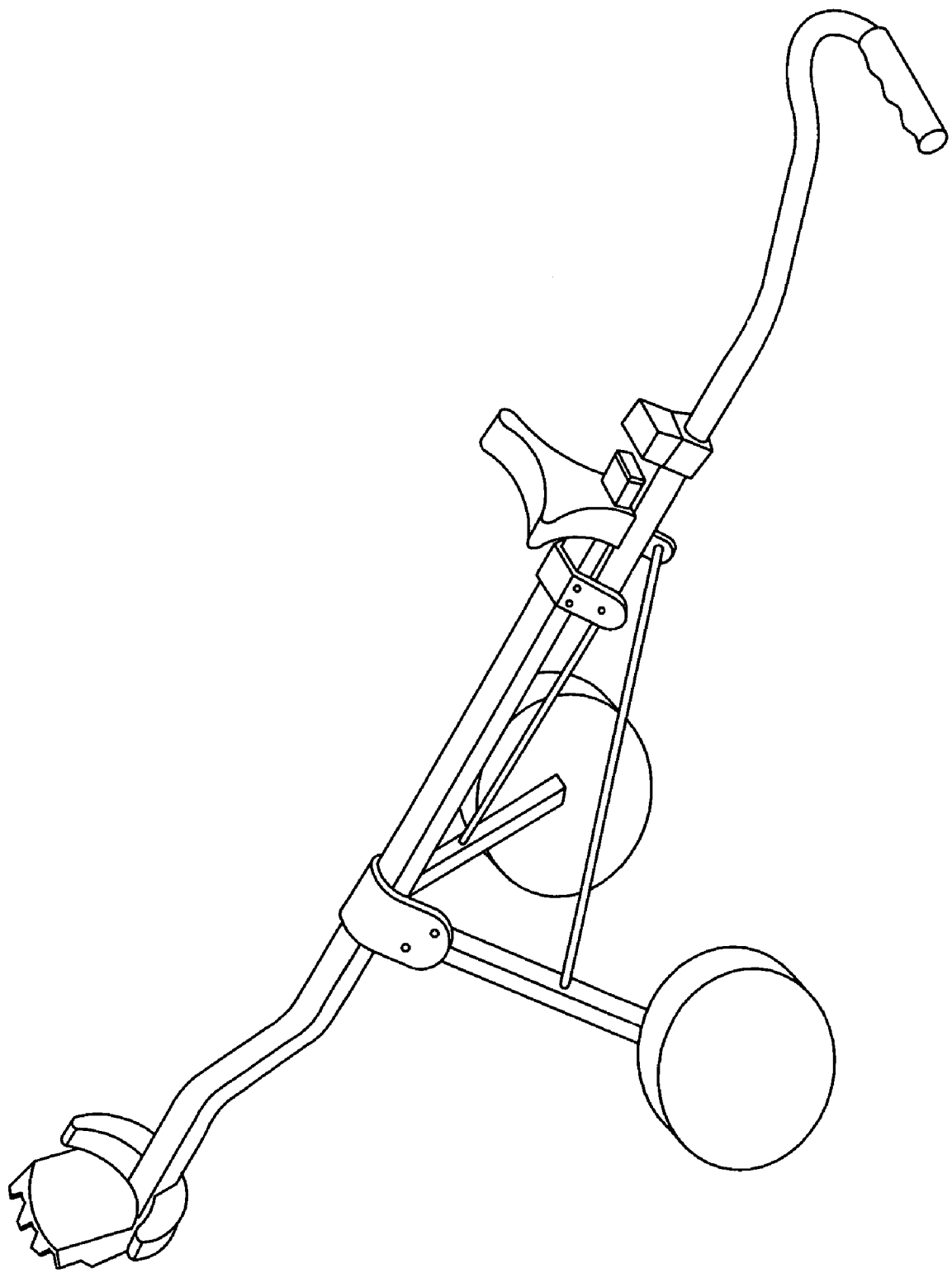
FIG. 7 is a schematic perspective view of a perspective view golf cart having two wheels.
Figure 8:
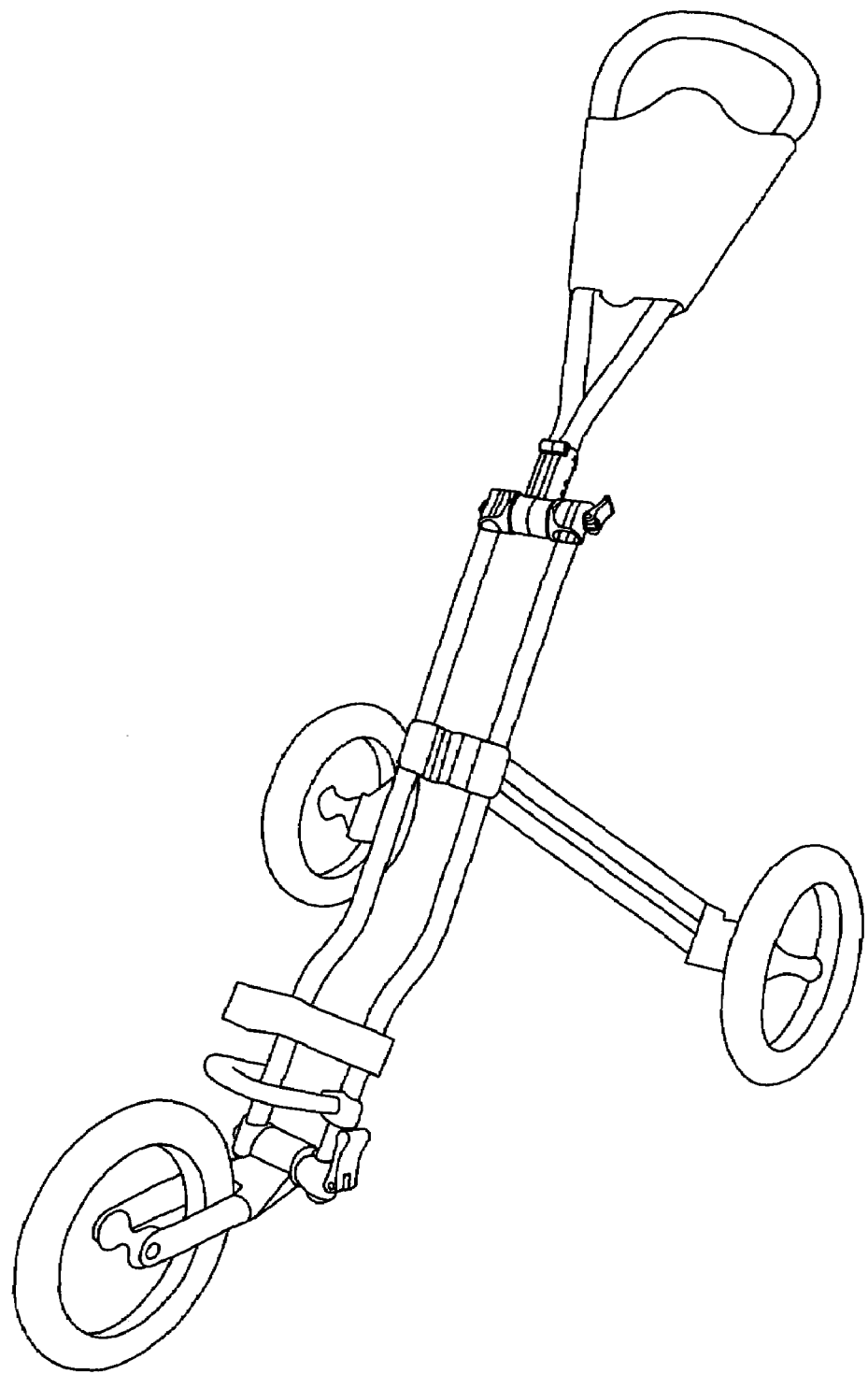
FIG. 8 is a schematic perspective view of a prior art golf cart having three wheels.

With reference to FIGS. 3 to 5, the plate 21 of the hook unit 20 is installed with at least one spring 211 for restoring the hook unit 20 to an original position.

Furthermore, in the present invention, a front edge of the tenon 22 has at least one inclined guide edge 221. When the connecting unit 1 is combined to the insertion unit 2, a front edge of the connecting unit 1 will eject the inclined guide edge 221 of the tenon 22. When the buckling groove 111 of the connecting unit 1 is pushed to a predetermined position, the tenon 22 can be inserted into the buckling groove 111 by the pressure of the spring 211. Thereby the combination can be performed easily.

By above mentioned structure, the easily detached and assembled golf cart with an auxiliary wheel of the present invention can be detached and assembled easily and rapidly so as to fit the requirement of environment. Thereby the golf cart can be folded for transfer or storage.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An easily detached and assembled golf cart with an auxiliary wheel comprising:
    a frame having two parallel tubes; each tube having an upper end, a lower end, and a mid-frame pivot installed between the upper end and the lower end;
    a first wheel rotatably fixed to a first wheel supporter;
    a second wheel rotatably fixed to a second wheel supporter;
    an auxiliary wheel;
    a connecting unit having a first retainer, a second retainer connecting to the first retainer and a wheel retainer; one end of the wheel retainer being pivotally connected to the auxiliary wheel; another end of the wheel retainer being connected to the second retainer; the first retainer having at least one buckling groove;
    an insertion unit; the first retainer being fixed to an insertion unit of the lower end of the frame; the insertion unit having two receiving ends at an upper ends for receiving the two tubes of the frame;
    a hook unit axially installed to the insertion unit; the hook unit having a plate; the plate having a tenon capable of being inserted into the buckling groove of the first retainer of the connecting unit; and
    wherein the first retainer is inserted into the frame of a lower hole of the insertion unit with the buckling groove of the first retainer is aligned to a lateral hole of the insertion unit; the tenon of the plate passes through the lateral hole of the insertion unit and the buckling groove of the first retainer and then is buckled into the buckling groove for assembling the connecting unit to the insertion unit; and
    wherein the plate of the hook unit is installed with at least one spring for restoring the hook unit to an original position, wherein the spring and the tenon are installed at two opposite sides of the plate.

2. The easily detached and assembled golf cart with an auxiliary wheel as claimed in claim 1, wherein the first wheel supporter and second wheel supporter are bendable with respect to the mid-frame pivot so that the first wheel supporter and second wheel supporter move closer to one another.

3. The easily detached and assembled golf cart with an auxiliary wheel as claimed in claim 1, wherein the frame further comprises a handle connected to the upper end of the frame; the handle is pivotally connected to a pivotal shaft of the upper end of the frame; the handle is pivotally installed to the pivotal shaft of the upper end.

4. The easily detached and assembled golf cart with an auxiliary wheel as claimed in claim 1, wherein a front edge of the tenon has at least one inclined guide edge.

* * * * *